INVENTORS
Francis B. Fishburne &
James J. Waldrop

INVENTORS
Francis B. Fishburne &
James J. Waldrop

BY J. Hanson Boyden

ATTORNEY

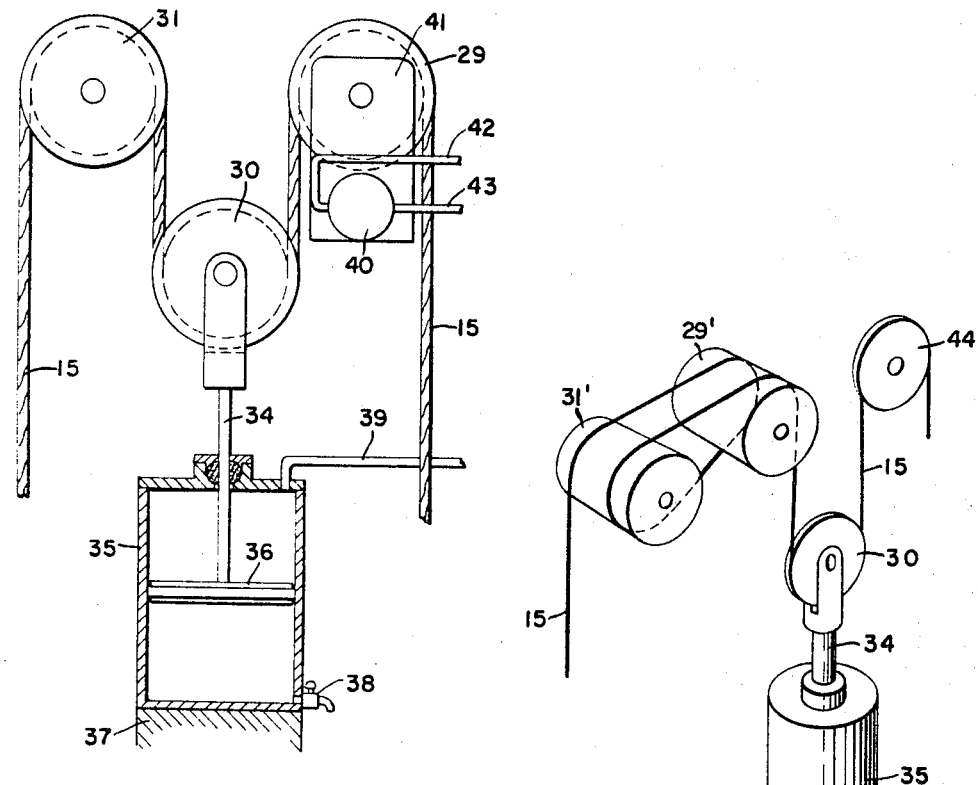
FIG.12.
FIG.13.
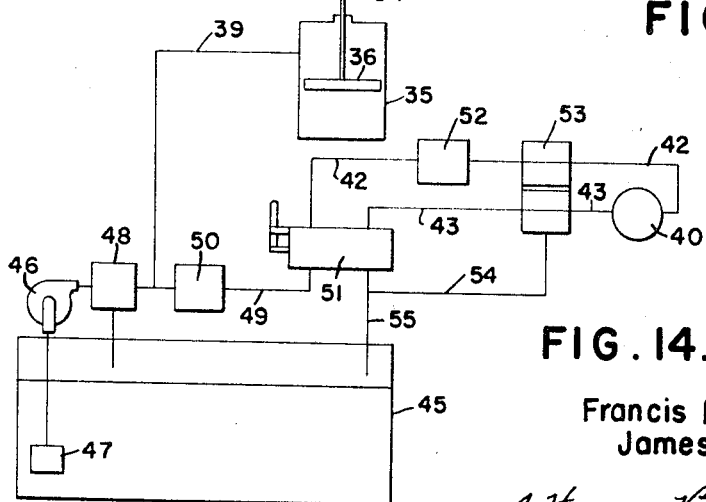
FIG.14.
INVENTORS
Francis B. Fishburne &
James J. Waldrop
BY *J. Hanson Boyden*,
ATTORNEY United States Patent Office 3,450,059
Patented June 17, 1969

3,450,059
CABLE HAULAGE SYSTEMS
Francis B. Fishburne and James J. Waldrop, Asheville, N.C. (both % Fishburne Equipment Company, Inc., P.O. Box 338, Arden, N.C. 28704)
Filed Jan. 9, 1967, Ser. No. 608,125
Int. Cl. B61b 9/00; B61j 3/04
U.S. Cl. 104—176
10 Claims

ABSTRACT OF THE DISCLOSURE

A brick manufacturing plant having a plurality of storage tracks, and a transfer car for moving kiln cars to and unloading them onto said storage tracks, the kiln car moving means comprising a cable operated wheeled dolly. Includes a rotary hydraulic motor for driving the cable, and means for automatically varying the tension on said cable in accordance with the load on said motor. Another feature is placing the driving motor and cable tensioning means above ground level between the storage tracks.

---

This invention relates to a cable haulage system for handling tramcars and the like in a manufacturing or storage plant.

While, in its broader aspects, it is applicable for other purposes, the invention is particularly useful and will be described in connection with a brick manufacturing plant.

Such a plant comprises a kiln, means for pushing through the kiln cars loaded with green brick, a series of tracks on which such cars can be stored after leaving the kiln, a transfer car track extending along the ends of the series of storage tracks at right angles thereto, a transfer car movable along said transfer car track to distribute the kiln cars to the various storage tracks, and some means for removing the loaded kiln cars from the transfer car and moving them along the storage tracks to the desired position.

A common arrangement for moving the kiln cars along the storage tracks is by means of a "dolly" having a "dog" for engaging the cars, and moved along parallel with the storage tracks by a haulage system including a cable attached to the dolly and passing over sheaves driven by a rotary motor, usually of the hydraulic type.

In order to maintain tension on the cable adjacent the driving sheaves, it has been the practice to loop over the cable at a point between the sheaves an idler pulley from which is suspended a counterweight.

This arrangement has been fairly satisfactory when the cable is driven in one direction but when the motor is reversed, so as to drive the cable in the opposite direction, and if the load on the cable becomes heavy, there is a tendency for the counterweight to rise, or be lifted up, causing the cable to slip, unless the counterweight is made heavier as the load increases—a thing which, of course, it is impossible to do.

It will be understood that the dolly may push one or a dozen or more cars, and that therefore the load on the motor and the resistance encountered by the cable varies through a wide range.

One important object of the invention is to provide means by which the tension applied to the cable adjacent the driving sheaves is adjusted automatically in accordance with the load on the motor. To this end, we substitute for the counterweight previously employed, a hydraulic cylinder and piston, and subject the piston to the action of motive fluid, the pressure of which varies with the pressure of the motive fluid supplied to the rotary motor that drives the sheaves. In this way, the cable may be driven in either direction, and slippage of the cable as the load increases is eliminated.

Another problem heretofore encountered in a system such as described is the removal of the loaded kiln cars from the transfer car. Owing to the fact that it has been the common practice to attach the cable to the dolly at substantially the end thereof, and a horizontal guide pulley for the cable has to be provided adjacent the transfer car track, it has been impossible to get the dolly close enough to the transfer car to enable the dog on the dolly to engage the kiln car on the transfer car so as to pull the kiln car off of the transfer car onto the storage track. Consequently, it has been necessary in the past to provide means for pushing the kiln car off of the transfer car. This has included a power-operated pushing device, such as a hydraulic cylinder, mounted on the transfer car itself. Equipping the transfer car with such a power-operated device adds greatly to the cost, and hence is objectionable.

Another object of the invention is therefore to devise means whereby the same dolly which propels the kiln cars along the storage tracks can also be used to remove the kiln car from the transfer car. We accomplish this by designing a novel type of dolly, namely, a dolly which has at one side of the point at which the cable is attached a longitudinally extending arm with a dog mounted near the forward end, the length of this arm being such that, when the dolly has been moved as close as possible to the transfer car track, the arm can reach under the kiln car far enough to enable the dog to engage it and pull it off of the transfer car.

A subsidiary object is to devise a novel construction of pivoted dog mounted in such a way as to be reversible, so that it can be set to push or pull the car in either direction.

It sometimes happens that it is desired to improve an existing plant by adding to it a dolly and cable haulage system. If using dolly tracks of the conventional type, this would require digging up the concrete in which the storage tracks are usually laid in order to place the dolly tracks in position between the rails of each of the storage tracks.

It is still another object of the invention to avoid this big expense by providing novel dolly tracks which can be laid on top of the existing concrete floor without constituting any objectionable obstructions. To this end, we have devised a dolly track consisting of a thin, flat strip, of a width approximating that of the dolly, so that the dolly practically straddles the strip.

As usual location for the power unit in a car haulage system of this type is between the rails of a track and in a pit below floor level. In such location, the power unit is subjected to water seepage and furthermore restricts the dolly travel.

Yet another object of the invention is to provide a power unit located above ground where it will be out of seepage, and located between the storage tracks where it will be out of the way of the dolly.

With the above and other objects in view, the invention consists in the construction, combination and arrangement of parts hereinafter described and claimed, and illustrated in the accompanying drawings, forming part of this specification, and in which:

FIG. 12 is a fragmentary view on an enlarged scale of part of the mechanism shown in FIG. 9, parts being in section;

FIG. 13 is a fragmentary diagrammatic perspective view of a slightly modified cable control arrangement; and FIG. 14 is a diagrammatic view of our improved hydraulic circuit for controlling and operating the cable system.

Figure 1:
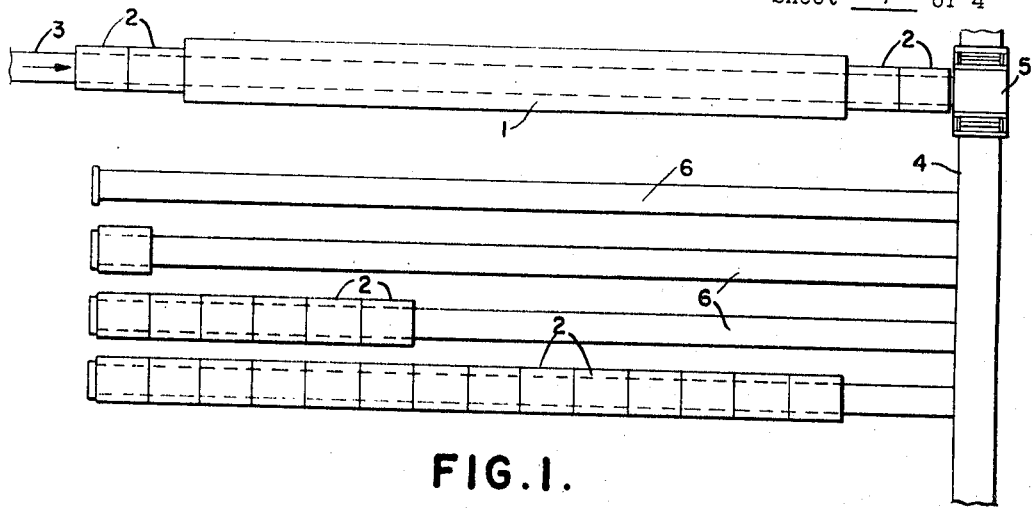
FIG. 1 is a diagrammatic plan view of a brick plant of the type in which the invention may be advantageously used.

Referring to the drawings in detail, and first more particularly to FIGS. 1 to 6, the brick plant includes a tunnel-type kiln 1 through which the kiln cars 2, loaded with brick are propelled by any suitable means (forming no part of the present invention). The cars, loaded with green brick, enter the kiln at the left-hand end, as viewed in FIG. 1, rolling on a suitable track 3, and are discharged from the right-hand end, onto a transfer car 5, rolling on a track 4 disposed at right angles to the kiln.

Figure 4:
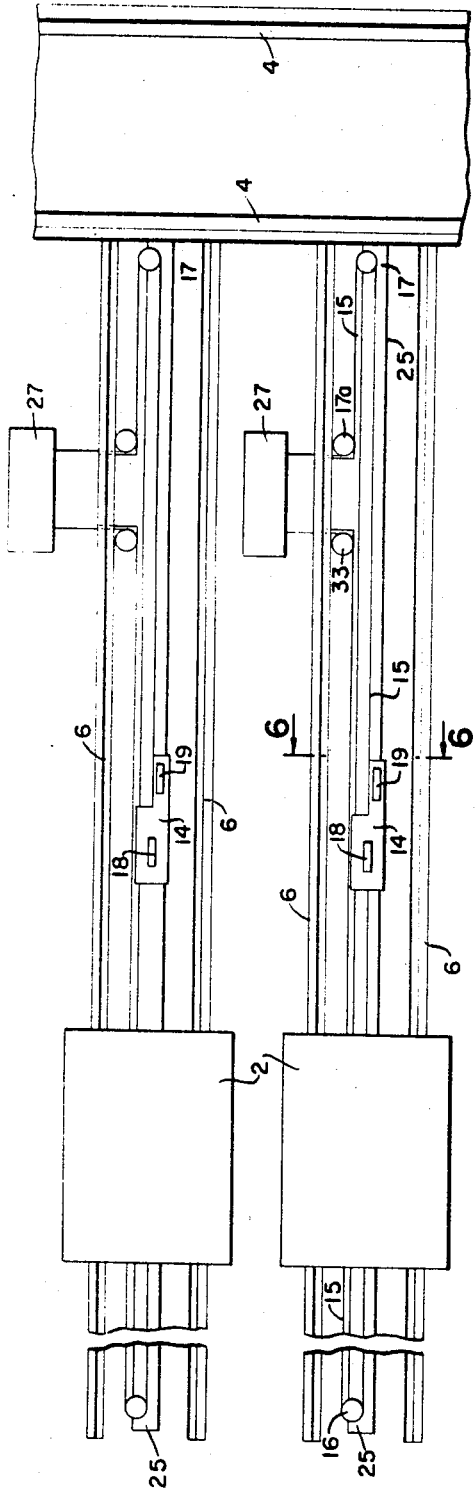
FIG. 4 is a plan view, on an enlarged scale, of part of the brick plant illustrated in FIG. 1, showing the invention applied thereto.

A series of storage tracks 6, substantially parallel with the kiln, are provided and these abut the transfer car track 4 at right angles thereto, as shown in FIGS. 1 and 4. The kiln cars 2, discharged from the kiln, are transported, one at a time, by the transfer car 5 to a point opposite any desired one of the storage tracks 6, where they are removed from the transfer car and propelled along the storage tracks by means of the present invention.

Figure 2:
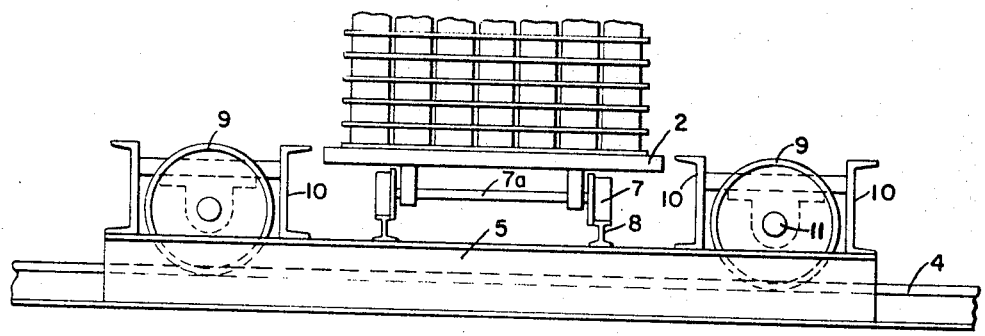
FIG. 2 is a side elevation of the transfer car, showing one of the kiln cars mounted thereon.
Figure 3:
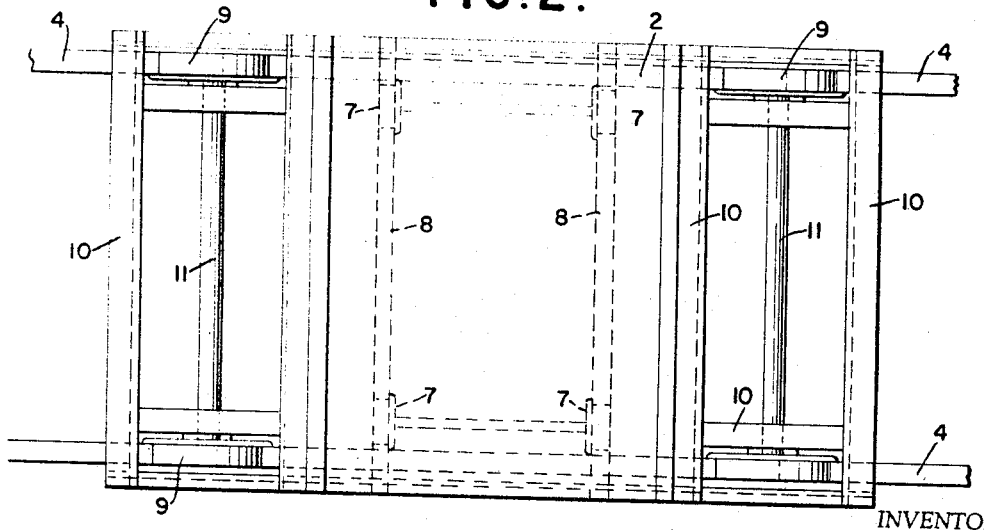
FIG. 3 is a plan view of the same, the load of bricks on the kiln car being omitted.

By reference to FIG. 2, it will be seen that the transfer car 5 is, as usual, constructed with two pairs of spaced cross-beams 10, supporting bearings in which axles 11, carrying flanged wheels 9 are journaled, the wheels being positioned between each of the pairs of cross-beams 10.

Figure 5:
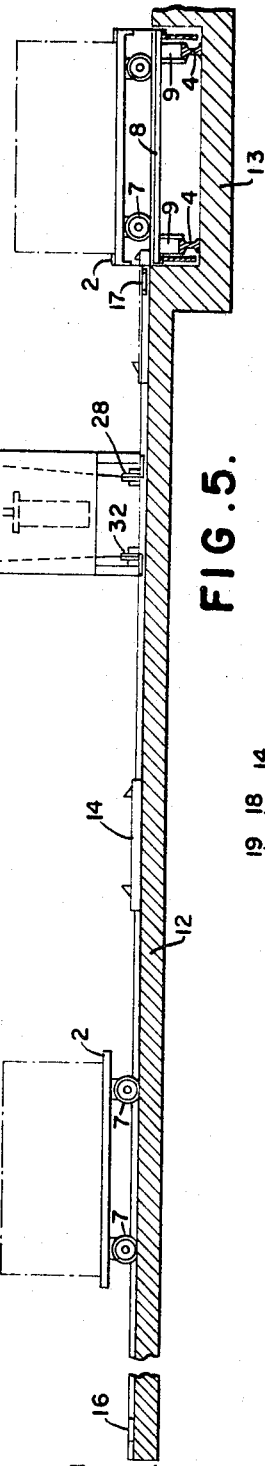
FIG. 5 is a side elevation of same, parts being in vertical section, and showing the transfer car, and one of the kiln cars carried by it.

These pairs of cross-beams are separated such a distance as to enable a kiln car 2 to be received between them. The kiln cars are provided with flanged wheels 7 which are supported on rails 8, extending transversely of the transfer car 5. The arrangement is such that when the transfer car is moved into position to discharge a kiln car onto one of the storage tracks 6, the rails 8 are brought into registry with the rails of the track 6, and, as shown in FIG. 5, at substantially the same level, so that the cars can roll off of the rails 8 onto the rails of the tracks 6.

Figure 6:
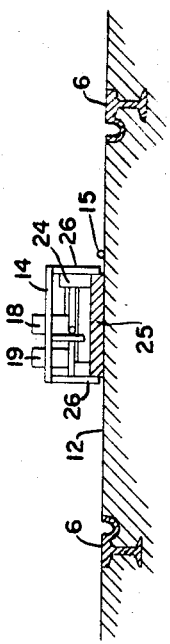
FIG. 6 is a transverse section on a somewhat enlarged scale taken substantially on the line 6—6 of FIG. 4, looking in the direction of the arrows.

In this connection, it may be pointed out that it is customary to embed the rails 6 in a concrete floor 12, so that the tops of such rails are flush with the surface of this floor, as shown in FIG. 6. Consequently, the rails are not visible in FIG. 5. In this figure, however, is shown a concrete trench or depression 13, on the bottom of which the rails 4 are supported, so as to bring the cross-rails 8 on a level with the rails of tracks 6.

To remove the kiln cars from the transfer car and propel them along the storage tracks, we employ the specially constructed improved dolly 14, in connection with each track.

Figures 9, 11:
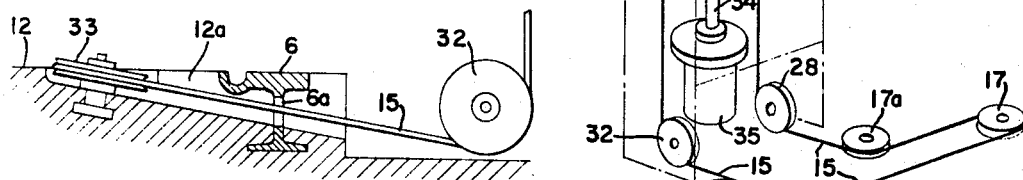
FIG. 9 is a diagrammatic perspective view showing our improved cable system.
FIG. 11 is a vertical section substantially on the line 11—11 of FIG. 10, and showing how the cable passes under the tread of the rail.

To obtain a general idea of the system, reference should be had to FIG. 9. A looped cable 15 is attached to each end of the dolly, and passes around a series of pulleys and sheaves by which it is guided and driven. At this point, it will suffice to explain that the cable has a long horizontal run parallel to the storage track, with the dolly interposed in this run, and at the ends of the run are horizontally disposed guide pulleys 16 and 17, the pulley 17 being mounted at the end of the storage track closely adjacent the transfer car track 4, as shown in FIGS. 4 and 5.

Figure 7:
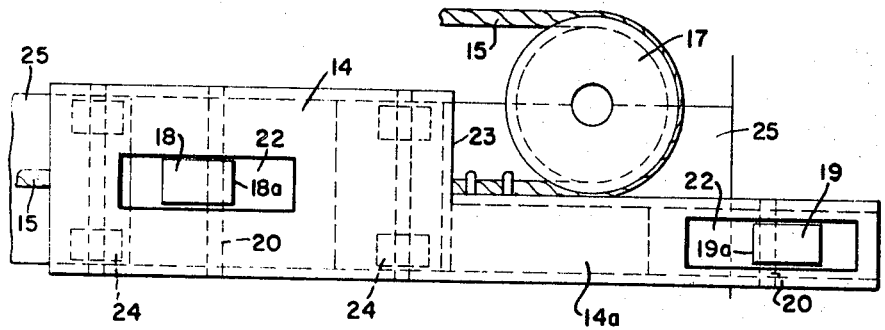
FIG. 7 is a plan view, on a greatly enlarged scale, of one of our improved dollies used for propelling the kiln cars.

It has heretofore been the common practice to make dollies of rectangular form, and to mount on them some kind of a pivoted dog for engaging the kiln car to push or pull it along. No matter how close to the end such a dog is mounted, it has been found impossible to get the dolly close enough to the transfer car to enable the dog to engage the kiln car and pull it off. This has been due to the presence of the pulley 17 adjacent the transfer car track, as shown in FIGS. 4, 5 and 7. Consequently, it has been necessary to provide additional means to remove the kiln car from the transfer car, such means having frequently taken the form of a hydraulic pusher cylinder mounted on the transfer car. This is objectionable on account of the expense involved.

We have solved the problem by providing a radically new form of dolly. We construct the dolly with a forwardly projecting arm or extension 14a at one side, and mount a dog at the forward end of this extension, the arrangement being such that when, in its travel toward the transfer car, the dolly is stopped by the pulley 17, the arm is long enough to bridge the gap and reach under the kiln car so that the dog may engage it. The cable is preferably attached to the dolly near the transverse center thereof, and this arm or extension lying at one side of the cable, forms with the body of the dolly a notch 23, as shown in FIGS. 7 and 9.

Figure 8:
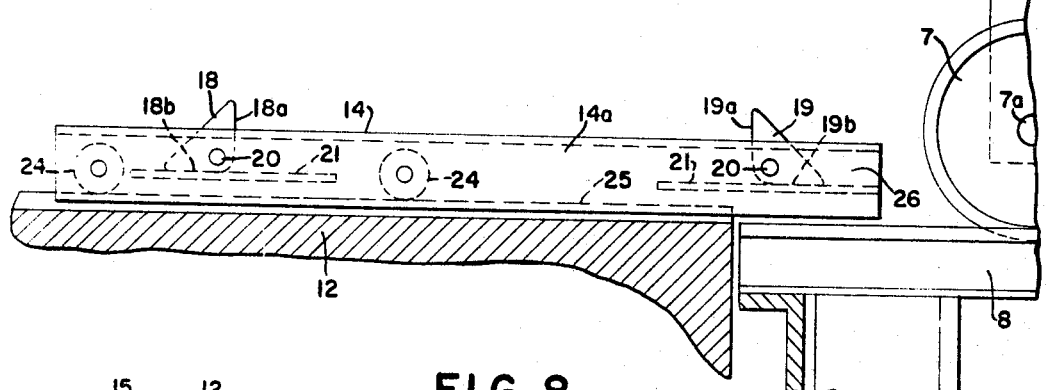
FIG. 8 is a side elevation thereof, also showing fragments of the transfer car and a kiln car carried thereby, parts being in vertical section.

In addition to devising a new form of dolly, we have designed an improved type of dog, all as shown in FIGS. 7 and 8. Preferably, we provide the dolly with two dogs 18 and 19, one disposed near each end. Each of these dogs is reversible and is substantially of the shape of a right-angled triangle, having two straight edges at right angles, 18a, 18b, and 19a, 19b. Each dog is pivotally mounted on a transverse shaft 20, located near the right angled apex, which is rounded on an arc about the center of said pivot shaft. Immediately below each dog is a fixed horizontal plate 21, against which either edge 18a, 18b, or 19a, 19b of each dog may engage. It will thus be understood that when the edge 19b of the dog 19, for example, is in the position shown in FIG. 8, engaging the plate 21, such plate serves as a stop means to hold the other edge 19a in vertical position, facing toward the left, so that it may engage behind the axile 7a of kiln car 2. If then, the dolly is moved by the cable to the left, it will pull the kiln car off of the transfer car onto one of the storage tracks 6.

When desired, the dog 19 may be swung over and reversed so that its edge 19a engages the stop means 21 and its edge 19b is caused to face toward the right, similar to the edge 18a of dog 18. If the dog 18 is reversed, so that its edge 18b is vertical, facing toward the left, it may be used to engage and push cars toward the left. Thus it will be seen that either dog may be used to either push or pull cars along, depending on the position of the dog with respect to the direction of movement of the dolly.

It will be understood that the wheels 7 of the kiln cars are made of such size that the dolly 14 may pass freely under the axles 7a. To enable it to do this, the dogs 18 and 19 must be swung on their pivots until the long edge of the triangle lies in horizontal position substantially flush with the upper surface of the dolly.

When a plant is being constructed, the storage track rails 6 are embedded in the concrete floor as shown in FIG. 6, and T-rails for the dolly may at the same time be laid between the storage track rails and also embedded in the concrete, to present a floor free from obstructions.

However, it frequently happens that it is desired to install a dolly system in a plant already built. In this case, it has heretofore been necessary to dig up the concrete floor, in order to lay rails for the dolly—a rather expensive operation. We have now solved the problem by devising a new kind of rail for the dolly.

The new dolly rail, in accordance with the invention, consists of a thin, flat, relatively wide strip 25 (FIG. 6) laid on top of the concrete floor between and parallel with the storage track rails 6. This strip is of such width that the dolly can just straddle it. The dolly is provided with wheels 24 having flat treads which roll on the portions of the strip adjacent both side edges thereof. These wheels may have flanges enagaging the side edges of the strip to guide the dolly, or, as shown, the side plates 26 of the dolly may extend low enough to engage the side edges of the strip and serve as guide means. This flat, wide strip is made relatively thin, preferably on the order of one-half one inch thick, the object being to keep it so thin that it will not present any substantial obstacle to rubber tired vehicles, such as trucks, moving over the floor.

Coming now to the cable system for propeliing the dolly, we have already referred to the looped cable 15 having its ends attached to the dolly, and passing around guide pulleys 16 and 17, as shown in FIG. 9. By further reference to this figure and to FIGS. 4 and 5, it will be seen that the system includes an elevated structure or "tower" 27 for each storage track. Mounted in this tower, to turn on horizontal axes are a pair of guide pulleys 28 and 32, near the bottom of the towers and a pair of drive sheaves 29 and 31, near the top of the tower.

Between the drive sheaves 29 and 31 there is a loop in the cable, in which is suspended a tension pulley 30. From the foregoing, it will be seen that the cable, starting from the dolly 14 in FIG. 9, passes first around the guide pulley 17, already discussed, then around guide pulleys 17a and 28, thence up around pulley 29, and thence around drive sheaves 29 and 31, and associated tension pulley 30. From sheaf 29, the cable passes downwardly around pulley 32, and horizontal guide pulleys 33 and 16, back to the dolly.

In tracing the course of the cable, as above described, it will be noted, by reference to FIG. 4, that, because each power unit is located between the storage tracks, the cable 15 necessarily has to cross one of the track rails 6. Obviously, it cannot overlie the tread of the rail, because in such position it would interfere with the passage of the kiln cars along the rails.

Figure 10:
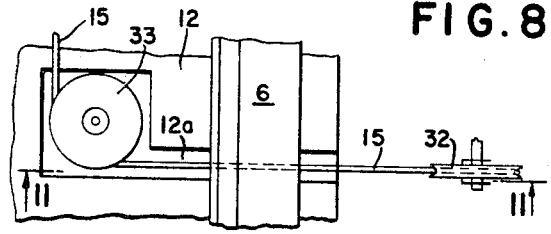
FIG. 10 is a fragmentary plan view showing one of the storage track rails and two of the pulleys illustrated in FIG. 9.

We have solved the problem by devising special means for allowing the cable to pass under the tread of the rail. This is shown in FIGS. 10 and 11.

Referring to these figures, we cut a notch or groove 12a in the concrete floor 12, extending transversely of the rail, and arrange the pulleys 32 and 33 so that the cable 15 passes through this groove, and through a hole 6a formed in the web of the rail 6. In this way the car wheels may run freely along the track rails without interfering in any way with the cable.

It will also be noted that by mounting the power unit on a "tower," it is up out of any seepage that may occur, and because the towers are located between the tracks, they are completely out of the way of the dollies.

The common practice heretofore has been to hang a counterweight on the tension pulley 30. This has proved very unsatisfactory, for the reason, among others, that it is, of course, impossible to change the amount of the counterweight as the load on the dolly varies, to regulate the tension on the cable in accordance with the load, which would be highly desirable.

The present invention provides an answer to this problem. We have devised a practical means for automatically adjusting the tension on the cable in accordance with the load.

To do this, we substitute for the conventional counterweight a hydraulic cylinder and piston and so arrange the hydraulic system that the pressure on the piston varies with the load on the cable. We call this an automatic hydrotensioning cylinder. For a detailed disclosure, reference will now be had to FIGS. 12 and 14.

Suspended from the tension pulley 30 is a piston rod 34 carrying a piston 36 working in a vertical cylinder 35, mounted on a fixed support 37. The lower end of the cylinder is provided with a normally open drain cock or the like to establish communication between the space below the piston and atmosphere, and also to discharge any motive fluid that may leak past the piston. A pipe 39 connects the upper end of the cylinder with a source of fluid under pressure, as will be hereinafter explained.

Both sheaves 29 and 31 may be driven, but as shown, only the sheave 29 is illustrated as driven. It is driven through a suitable gear box 41 by means of a reversible, rotary hydraulic motor 40, to which motive fluid is supplied in one direction or the other by pipes 42, 43.

FIG. 14 diagrammatically illustrates the hydraulic system.

The motive fluid is contained in a tank 45, from which it is drawn by a rotary pump 46, through a filter 47, and delivered into a pipe 49, a pressure relief valve 48, discharging back into the tank, being interposed in this pipe.

Tapping the pipe 49 just beyond the relief valve is the pipe 39 leading to the cylinder 35. Beyond this pipe, a so-called "sequence valve" 50 is interposed in the pipe 49, and the pipe is then connected with a conventional four-way valve 51. The sequence valve is an automatic pressure regulating valve. It may be set to deliver motive fluid to the motor at any desired pressure from 0 up to the full pressure generated by the pump. From this four-way valve extend the pipes 43, 42 leading to the motor 40, a second "sequence valve" 52 being preferably interposed in pipe 42 to regulate the pressure when the motor is reversed. A dual relief valve 53 is interposed in both pipes, and discharges back to tank through pipe 54, connected with discharge pipe 55 from the four-way valve.

From the foregoing, it will be seen that the motive fluid is delivered by the pump simultaneously to both the cylinder 35 and the motor 40, so that the pressure in the cylinder, although usually higher than that at the motor, will vary as the pressure supplied to the motor varies, i.e., as the load on the motor varies. When the load on the motor becomes heavier, the pressure in the cylinder becomes greater, so that the tension on the cable is automatically adjusted by the piston in accordance with the load.

Referring now to FIG. 13, we have shown a somewhat modified arrangement of cable and sheaves. In this case, the sheaves are actually shown as drums 29' and 31', and the cable 15 takes several turns around the two drums. After the last turn, the cable passes under the pulley 30, connected with the cylinder piston, and thence passes up and over an idler pulley 44.

FIG. 13 shows that it is not necessary for the pulley 30 to be located actually between the two sheaves as in FIG. 12 in order to automatically adjust the tension on the cable as described. It can be located between one of the sheaves and an idler.

Where, in the appended claims, we use the word "sheaves," it will be understood that we intend to include the drums, as shown in FIG. 13.

What is claimed is:

1. In a cable haulage system, a dolly movable along a track, a cable attached to opposite ends of said dolly, a pair of sheaves over which said cable passes, a reversible rotary motor driving at least one of said sheaves, and means for applying to said cable at a point adjacent and between said sheaves tension which is automatically adjusted in accordance with the load on said motor.

2. A system in accordance with claim 1 in which the rotary motor is a hydraulic motor, and in which the means for automatically adjusting the tension on said cable comprises a hydraulic cylinder, a piston in said cylinder having a rod, a pulley carried by said rod around which pulley said cable is looped, said cylinder being connected with the same source of motive fluid as that which supplies said rotary motor, so that the pressure in said cylinder varies with that in said motor.

3. A system for handling cars in a brick making plant comprising a kiln, a storage track, a transfer car track extending from said kiln to one end of said storage track at an angle thereto, a transfer car movable over said transfer car track and constructed to receive cars discharged from said kiln and transport them to said storage track, and means independent of said transfer car travelling in a path parallel with said storage track and constructed to engage a kiln car supported on said transfer car and pull it off of said transfer car onto said storage track.

4. A system in accordance with claim 3 in which the said traveling means is in the nature of a wheeled dolly propelled by a cable in both directions, said dolly having a part constructed to engage a kiln car supported on said transfer car and pull it off of said transfer car onto said storage track.

5. A system in accordance with claim 3 in which the said traveling means is in the nature of a wheeled dolly, to which a cable is attached for propelling it in both directions, a guide pulley for said cable located in the path of travel of said dolly adjacent said transfer car track, whereby the body of said dolly cannot approach said transfer car closely, because of being blocked by said pulley, and said dolly having a portion at one side of said guide pulley and equipped near its end with a dog, said portion extending forwardly a sufficient distance to enable said dog to reach and engage said kiln car when said dolly is stopped by said pulley.

6. A plant having a hard, level floor, and a pair of rails embedded in said floor and constituting a car storage track, in combination with a cable-operated wheeled dolly for propelling cars along said track, and a guide track for said dolly comprising a relatively wide, flat, thin strip supported on said floor and extending parallel with said storage track, the dolly straddling said wide, flat strip with its wheels resting on the upper surface of said strip adjacent both side edges thereof.

7. A plant in accordance with claim 6 in which the tops of the rails constituting the car storage track are flush with the surface of said floor, and said wide, flat strip constituting the dolly track is laid on said floor between said storage track rails, the thickness of said strip being so small as to permit the free travel of rubber-tired vehicles over said floor and tracks.

8. A plant in accordance with claim 10 in which the cable extending from said dolly to said power unit passes under the tread of one of said rails.

9. A plant having a plurality of article carrying cars, a storage track to accommodate said cars, and a cable operated dolly movable along said track, said dolly having a reversible pivoted dog substantially in the shape of a right triangle with the pivot located near the right angled apex, and means for holding either side edge of said dog in vertical position so that it may engage and propel the cars, said dog being also capable of occupying a position with the hypothenuse of the triangle extending horizontally, and when in this position the dolly is low enough to pass freely under the cars, including the wheel axles, without engaging any part of them.

10. A plant having a hard level floor, and two pairs of rails embedded in said floor with their treads substantially flush with the surface thereof and constituting car storage tracks, a cable operated dolly for propelling cars along each of said tracks, and a power unit for driving said cable, said unit being located above said floor between said storage tracks.

References Cited
UNITED STATES PATENTS

| | | | |
|---|---|---|---|
| 206,416 | 7/1878 | Bowman | 104—119 |
| 1,645,783 | 10/1927 | Weber | 104—173 |
| 1,766,225 | 6/1930 | Moon | 104—172 |
| 2,554,984 | 5/1951 | Hegel | 104—50 |
| 3,217,660 | 11/1965 | Shillinger | 104—114 |
| 3,372,652 | 3/1968 | Garbers | 104—26 |

ARTHUR L. LA POINT, *Primary Examiner.*

DANIEL F. WORTH, III, *Assistant Examiner.*

U.S. Cl. X.R.

104—178